United States Patent
Matthew et al.

[15] 3,656,941
[45] Apr. 18, 1972

[54] HYDROMETALLURGICAL TREATMENT OF SILICEOUS ZINC ORES

[72] Inventors: Ian George Matthew, Moonah; Dagwin Elsner, Sandy Bay, both of Australia

[73] Assignee: Electrolytic Zinc Company of Australasia Limited, Melbourne, Victoria, Australia

[22] Filed: Mar. 4, 1969

[21] Appl. No.: 804,259

[30] Foreign Application Priority Data

Mar. 13, 1968 Canada............................34922/68

[52] U.S. Cl. ...........................75/119, 75/101 BE, 75/121, 23/87 R, 204/113, 23/312 R
[51] Int. Cl. ..................................................C22b 23/04
[58] Field of Search...............204/119; 75/120; 23/113, 182

[56] References Cited

UNITED STATES PATENTS

| | | | |
|---|---|---|---|
| 3,510,414 | 5/1970 | Orlandini et al. | 204/119 |
| 3,434,798 | 3/1969 | Menendez et al. | 75/120 |
| 2,874,041 | 2/1959 | Radino | 75/120 |
| 2,599,816 | 6/1952 | Ellsworth | 204/119 |
| 1,362,166 | 1/1920 | Laist et al. | 204/119 |
| 1,320,805 | 11/1919 | Stewart et al. | 204/119 |
| 1,295,080 | 2/1919 | Sulman et al. | 204/119 |
| 1,281,031 | 10/1918 | Laist | 204/119 |
| 1,154,602 | 9/1915 | Best | 204/119 |
| 1,006,330 | 10/1911 | Williams et al. | 204/119 |
| 594,611 | 11/1897 | Emmens | 204/119 |

FOREIGN PATENTS OR APPLICATIONS

| | | | |
|---|---|---|---|
| 15,988 | 12/1885 | Great Britain | 204/119 |
| 491,959 | 4/1953 | Canada | 204/119 |
| 13,850 | 8/1894 | Great Britain | 204/119 |

*Primary Examiner*—John H. Mack
*Assistant Examiner*—R. L. Andrews
*Attorney*—Pierce, Scheffler and Parker

[57] ABSTRACT

A process for the recovery of metal values from a siliceous zinc ore whereby the ore is treated with aqueous sulfuric acid in a continuous manner in a first and second stage, in at least two stirred vessels. The ore is leached to an end point pH in the range of 1.5–2.5 over a period of 1–6 hours in the first stage yielding a pulp which is continuously transferred to the second stage where the pH is held to 4.9–5.3 for a period of 1–14 hours, yielding a readily filterable pulp.

2 Claims, No Drawings

HYDROMETALLURGICAL TREATMENT OF SILICEOUS ZINC ORES

This invention relates to a continuous hydrometallurgical process for the treatment of siliceous zinc ores as hereinafter defined.

By the phrase "siliceous zinc ore" as used in this specification is meant primarily a zinc silicate ore but it is also intended to include a zinc ore containing substantial quantities of soluble silica being silica soluble in aqueous sulphuric acid, forming either a true solution or a colloidal solution, the soluble silica deriving either from portion of the metal-bearing constituent itself or from the gangue. For example, metal-bearing leach liquors derived from such ore by treatment with aqueous sulphuric acid may contain 6 to 50 grams of silica per liter, or more often, 10 to 30 grams of silica per litre. The term "ore" is intended also to include concentrate, roasted ore, roasted concentrate, slag, residue, or other metalliferous material.

The process of the invention is primarily applicable to the treatment of zinc ores such as those consisting of or containing willemite, hemimorphite, or other zinc silicate minerals.

The hydrometallurgical treatment of such ores presents considerable problems, because the soluble silica is extracted with the metal values during the leaching operation and when subsequently efforts are made to remove the silica from solution, it often precipitates in the form of an unfilterable or difficulty filterable gelatinous precipitate or gel, entraining large quantities of the metal values in the adhering liquors.

According to a preferred embodiment of the present invention there is provided a process for the recovery of metal values from a siliceous zinc ore which is conducted in a continuous concurrent manner and which comprises a first stage, effected in one or more vessels, in which the said ore is leached with aqueous sulphuric acid to an end-point pH in the range 1.0 to 3.0, preferably in the range 1.5 to 2.5, to obtain a leach liquor or pulp containing dissolved zinc values and 6 to 50 grams of silica per liter, and a second stage, effected in one or more vessels, in which the pH of leach liquor or pulp from the first stage is raised, for example by the addition of neutralising agent, to a pH in the range 4.5 to 6.0, preferably in the range 4.9 to 5.3, such that substantially the whole or a major part of the silica content of the said leach liquor or pulp is converted into a form in which it is readily separated by conventional techniques.

Both process stages may be operated successfully at temperatures up to the boiling points of the solutions at atmospheric pressure, and operating temperatures between ambient temperature (say 20° to 30° C.) and the boiling point, preferably between ambient temperature and about 95° C., are therefore envisaged. In certain circumstances, the process may be carried out without applying heat.

The aqueous sulphuric acid necessary for the treatment of the siliceous ore may contain for example, 80 to 300 grams of $H_2SO_4$ per litre. Spent electrolyte from the conventional process for the electrodeposition of zinc, or such spent electrolyte fortified to compensate for acid losses, may conveniently be used as the leaching agent.

The vessels in which the process is carried out are preferably provided with means for maintaining an appropriate degree of agitation of the leach liquor or pulp.

Preferably the pH of the leach liquor or pulp is raised during the course of the treatment process by the addition of the requisite amount of zinc ore, zinc concentrate, zinc oxide, calcined zinc sulphide, oxide fume, calcium carbonate, or other suitable neutralising agent. The process is conducted in two stages, the second stage being considered to begin at the point where additions of neutralizing agent are made to increase the pH of the leach liquor or pulp.

Residence times of the liquor or pulp in each of the process stages may lie in the range 5 minutes to 24 hours, with a preferred residence time in the first stage of 1 to 6 hours, and a preferred residence time in the second stage of 1 to 14 hours. However, these figures are by way of example only, since the residence times will be determined largely by the nature of the ore under treatment. Similarly, either or both of the process stages may be divided into a number of steps, effected in separate vessels, as determined by the circumstances of treatment. Thus for instance the second stage may comprise two or more steps employing the same or different residence times in each step. The term "vessel" in this specification includes a compartment or chamber.

In some circumstances it may be desirable to re-circulate portions of pulp or thickened pulp from the second stage to the first or second stages of the process. In this way a coarser silica precipitate may be obtained thus facilitating its separation from the metal-bearing liquors.

The pulp leaving the last process step or stage contains suspended silica in particulate form, and the silica is readily amenable to separation by conventional techniques with good efficiencies, giving a liquor that can be incorporated in a conventional electrolytic zinc plant circuit.

It will be understood that both the process of leaching metal values from the ore and the process of converting the silica content of the leach solution into particulate form proceed simultaneously, and occur to a varying extent in all steps of the process.

Lead minerals are also often present in siliceous zinc ores, and these lead values may be recovered without undue detriment to the efficiency of zinc extraction by operating the process of the invention in an appropriate manner. Thus the first stage of the process may be effected so as to dissolve substantially all of the soluble silica content of the ore so that a separation of lead-rich primary residue can be made before the silica is coagulated in the second stage of the process. The lead-rich primary residue so obtained suffers the minimum contamination from silica and is readily amenable to further treatment by conventional techniques for the production of metallic lead. Similarly other metal values, such as tungsten, which are not solubilized on leaching may be separated in a primary residue enriched with respect to these metal values before the silica is coagulated in the second stage of the process.

The invention is illustrated by the following Examples:

EXAMPLE 1

A zinc silicate ore containing 56.0% total zinc and 25.1% silica was treated by a two-stage continuous process in accordance with the invention using a synthetic electrolytic zinc plant spent electrolyte containing 52.0 grams of Zn per liter and 96.0 grams of $H_2SO_4$ per liter as the leaching agent. Experimental details are given below:

First stage
  Two step leach using 126.6 grams of ore per litre of synthetic spent electrolyte, the pulp being overflowed from vessel to vessel. Temperature 50° C., end-point pH 2.1. Residence time 2 hours.

Second Stage
  The pulp from the first stage was treated in two steps at a temperature of 50° C. and a pH of 5.3, the pulp being overflowed from vessel to vessel. Overall residence time was 2 hours. The pH was raised and controlled by the addition of zinc oxide to the pulp at the commencement of the second stage.

Samples of pulp from the second step of the second stage of the treatment were tested to determine their filtration characteristics. The results are tabulated below:

TABLE 1

| Weight of wet filter cake (grams) | Filtration rate (gallons filtrate per sq. ft. per minute) | Ratio of weight of wet filter cake to weight of ore | Percentage moisture in wet filter cake |
|---|---|---|---|
| 80.1 | 0.43 | 2.10 | 59.4 |

The filtrate had a silica content of 0.7 grams per liter.

Filtration rates were determined using 300 ml of the uncooled pulp and a 13 cm diameter Buchner funnel with Balston No.2 filter paper at a vacuum of 20 inches mercury. The percentage moisture in the wet cake was based upon the weight lost by the wet filter cake on drying at 105° C. for 12 hours.

The above procedure was repeated, effecting the two-stage operation batchwise, other experimental details being unchanged. The results are tabulated below:

TABLE 2

| Weight of wet filter cake (grams) | Filtration rate (gallons filtrate per sq. ft. per minute) | Ratio of weight of wet filter cake to weight of ore | Percentage moisture in wet filter cake |
| --- | --- | --- | --- |
| 185.2 | 0.026 | 5.0 | 62.5 |

The filtrate had a silica content of 0.7 grams per liter.

It will be understood that the low weight of wet filter cake obtained by operating the process in accordance with the method of the invention is due to the low amount and effective utilisation of the neutralising agent used to raise the pH in the second stage and to low solution entrainment in the wet filter cake.

The markedly improved filtration characteristics obtained by operating the process in accordance with the method of the invention can readily be seen from the results quoted herein.

EXAMPLE 2

A zinc silicate ore containing 32% total zinc and 30% silica was treated by a two-stage continuous process in accordance with the invention using a synthetic electrolytic zinc plant spent electrolyte containing 50.4 grams of Zn per litre and 99.2 grams of $H_2SO_4$ per litre as the leaching agent. Experimental details are given below:

First Stage
  Two step leach using 209.5 grams of ore per liter of synthetic spent electrolyte. Temperature 30° to 35° C. (no heating), end-point pH 2.4. Residence time 2.9 hours.

Second Stage
  The pulp from the first stage was treated in two steps at a temperature of 30° to 35° C. (no heating) and a pH of 5.3. Overall residence time was 2.9 hours. The pH was controlled as in the previous Example.

Samples of pulp from the second step of the second stage of the treatment were tested to determine their filtration characteristics. The results are tabulated below:

TABLE 3

| Weight of wet filter cake (grams) | Filtration rate (gallons filtrate per sq. ft. per minute) | Ratio of weight of wet filter cake to weight of ore | Percentage moisture in wet filter cake |
| --- | --- | --- | --- |
| 88.5 | 0.074 | 1.41 | 46.7 |

The filtrate had a silica content of 0.12 grams per liter. Filtration rates were determined as in the previous Example.

The above procedure was repeated effecting the two-stage operation batchwise, other experimental details being unchanged. The results are tabulated below:

TABLE 4

| Weight of wet filter cake (grams) | Filtration rate (gallons filtrate per sq. ft. per minute) | Ratio of weight of wet filter cake to weight of ore | Percentage moisture in wet filter cake |
| --- | --- | --- | --- |
| 145.5 | 0.026 | 2.5 | 59.6 |

The filtrate had a silica content of 0.18 grams per liter.

EXAMPLE 3

A zinc silicate ore containing 56.0% total zinc, 0.5% lead and 25.1% silica was treated by a two-stage continuous process in accordance with the invention, including the separation of a lead-rich primary residue after the first stage. A synthetic electrolytic zinc plant spent electrolyte containing 48.4 grams of Zn per liter and 94.8 grams of $H_2SO_4$ per liter was used as the leaching agent. Experimental details are given below:

First stage
  Two-step leaching operation, using 123.8 grams of ore per liter of synthetic spent electrolyte. Temperature 35° C., and end-point pH 2.3. Overall residence time 3 hours. Leach pulp was filtered to obtain 0.056 grams of lead-rich residue per gram of ore. The lead-rich residue contained 8.9% Pb and 21.6% insolubles. The filtered leach liquor contained 110.4 grams of Zn per liter, 28.0 grams of $SiO_2$ per liter, 0.26 grams of Fe per liter and 0.2 grams of Al per liter.

Second Stage
  The filtrate from the first stage was treated in two steps at a temperature of 95° C. and a pH of 5.2. Overall residence time 3 hours. The pH was raised and controlled by the addition of zinc oxide.

Samples of pulp from the second step of the second stage of the process were tested to determine their filtration characteristics as in the previous Examples.

TABLE 5

| Weight of wet filter cake (grams) | Filtration rate (gallons filtrate per sq. ft. per minute) | Ratio of weight of wet filter cake to weight of ore | Percentage moisture in wet filter cake |
| --- | --- | --- | --- |
| 75.5 | 0.385 | 1.56 | 54.0 |

The filtrate had a silica content of 0.04 grams per liter.

The above procedure was repeated, effecting the process batchwise, other experimental details being unchanged. The results are tabulated below:

TABLE 6

| Weight of wet filter cake (grams) | Filtration rate (gallons filtrate per sq. ft. per minute) | Ratio of weight of wet filter cake to weight of ore | Percentage moisture in wet filter cake |
| --- | --- | --- | --- |
| 175.2 | 0.052 | 4.3 | 68.2 |

The filtrate had a silica content of 0.08 grams per liter.

EXAMPLE 4

A zinc silicate ore containing 41.2% total zinc and 22.0% silica was treated by a two-stage continuous process in accordance with the invention using a synthetic electrolytic zinc plant spent electrolyte containing 52.7 grams of Zn per litre and 94.8 grams of $H_2SO_4$ per liter as the leaching agent. Experimental details are given below:

First Stage
 Two step leach using 160 grams of ore per liter of synthetic spent electrolyte. Temperature 27° C., endpoint pH 2.0. Residence time 2 hours.
Second Stage
 The pulp from the first stage was treated in two steps at a temperature of 50° C. and a pH of 5.5. The overall residence time was 3 hours. The pH was raised and controlled by the addition of calcined zinc sulphide.

Samples of pulp from the second step of the second stage of the treatment were tested to determine their filtration characteristics. The results are tabulated below:

TABLE 7

| Weight of wet filter cake (grams) | Filtration rate (gallons filtrate per sq. ft. per minute) | Ratio of weight of wet filter cake to weight of ore | Percentage moisture in wet filter cake |
| --- | --- | --- | --- |
| 119 | 0.212 | 3.2 | 45 |

The filtrate had a silica content of 0.3 grams per liter.

The above procedure was repeated effecting the two-stage operation batchwise, other experimental details being unchanged. The results are tabulated below:

TABLE 8

| Weight of wet filter cake (grams) | Filtration rate (gallons filtrate per sq. ft. per minute) | Ratio of weight of wet filter cake to weight of ore | Percentage moisture in wet filter cake |
| --- | --- | --- | --- |
| 260 | 0.071 | 5.6 | 57.8 |

The filtrate had a silica content of 0.2 grams per liter.

EXAMPLE 5

A zinc silicate ore containing 41.2% total zinc, 3.2% lead, and 22.0% silica was treated by a two-stage continuous process in accordance with the invention, including the separation of a lead-rich primary residue after the first stage. A synthetic electrolytic zinc plant spent electrolyte containing 50.6 grams of Zn per liter and 96.0 grams of $H_2SO_4$ per liter was used as the leaching agent. Experimental details are given below:

First Stage
 Two-step leaching operation, using 160 grams of ore per litre of synthetic spent electrolyte. Temperature 30° C., end point pH 2.0. Overall residence time 2 hours. Leach pulp was filtered to obtain 0.34 grams of lead-rich residue per gram of ore. The lead-rich residue contained 9% Pb and 17.4% insolubles. The filtered leach liquor contained 107.6 grams of Zn per liter, 24.4 grams of $SiO_2$ per liter, 12 milligrams of Fe per liter and less than 0.2 grams of Al per liter.
Second Stage
 The filtrate from the first stage was treated in two steps at a temperature of 95° C. and a pH of 5.3. Overall residence time was 3 hours. The pH was raised and controlled by the addition of calcined zinc sulphide. Calcined zinc sulphide consumption was 0.127 grams per gram of ore.

Samples of pulp from the second step of the second stage of the process were tested to determine their filtration characteristics and the results are tabulated below:

TABLE 9

| Weight of wet filter cake (grams) | Filtration rate (gallons filtrate per sq. ft. per minute) | Ratio of weight of wet filter cake to weight of ore | Percentage moisture in wet filter cake |
| --- | --- | --- | --- |
| 68.0 | 0.319 | 1.63 | 53 |

The filtrate from the second stage had a silica content of 0.4 grams per liter.

The above procedure was repeated effecting the process batchwise, other experimental details being unchanged. The results are tabulated below:

TABLE 10

| Weight of wet filter cake (grams) | Filtration rate (gallons filtrate per sq. ft. per (minute) | Ratio of weight of wet filter cake to weight of ore | Percentage moisture in wet filter cake |
| --- | --- | --- | --- |
| 179 | 0.078 | 4.1 | 60 |

The filtrate from the second stage had a silica content of 1.9 grams per liter. Calcined zinc sulphide consumption in the second stage of the batch process was 0.43 grams per gram of ore.

The acid-soluble zinc content of the unutilized calcined zinc sulphide used to raise and control the pH in the second stage may be recovered by repulping the wet filter cake obtained by filtering the pulp from the second stage, in sulphuric acid or electrolytic zinc plant spent electrolyte of appropriate strength. Dilute sulphuric acid containing up to 100 grams of $H_2SO_4$ per liter will give a recovery of 90% or more of the total zinc content of the wet filter cake within one-half hour. The filtrates from the repulping operation will contain less than 1 gram of silica per liter. However, neither the acid-insoluble zinc content nor other insoluble metal values in the calcined zinc sulphide will be recovered by repulping as described above.

EXAMPLE 6

A zinc silicate ore containing 41.2% total zinc, 3.2% lead, and 22.0% silica was treated by a two-stage continuous process in accordance with the invention, including the separation of a lead-rich primary residue after the first stage. A synthetic electrolytic zinc plant spent electrolyte containing 52.7 grams of Zn per liter and 94.8 grams of $H_2SO_4$ per liter was used as the leaching agent. Experimental details are given below:

First stage
 Two step leaching operation, using 160 grams of ore per liter of synthetic spent electrolyte. Temperature 30° C., end point pH 2.0. Overall residence time 2.3 hours. Leach pulp was filtered to obtain 0.3 gram of lead-rich residue per gram of ore. The lead-rich residue contained 9.3% Pb and 17% insolubles. The filtered leach liquor contained 101.8 grams of Zn per liter, 22.0 grams of $SiO_2$ per liter, 0.30 grams of Fe per liter and 0.16 grams of Al per liter.
Second Stage
 The filtrate from the first stage was treated in two steps at a temperature of 50° C. and a pH of 5.5. Overall residence time was 2.6 hours. The pH was raised and controlled by the addition of calcined zinc sulphide.

Samples of pulp from the second step of the second stage of the process were tested to determine their filtration characteristics and the results are tabulated below:

TABLE 11

| Weight | Filtration | Ratio of | Percentage |
| --- | --- | --- | --- |

| Weight of wet filter cake (grams) | Filtration rate (gallons filtrate per sq. ft. per minute) | Ratio of weight of wet filter cake to weight of ore | Percentage moisture in wet filter cake |
|---|---|---|---|
| 130 | 0.222 | 2.96 | 53 |

The filtrate from the second stage had a silica content of 0.35 grams per liter.

The above procedure was repeated, effecting the process batchwise, other experimental details being unchanged. The results are tabulated below:

TABLE 12

| Weight of wet filter cake (grams) | Filtration rate (gallons filtrate per sq. ft. per minute) | Ratio of weight of wet filter cake to weight of ore | Percentage moisture in wet filter cake |
|---|---|---|---|
| 236 | 0.088 | 5.3 | 55 |

The filtrate from the second stage had a silica content of 0.3 grams per liter.

We claim:

1. In a process for the recovery of metal values from a siliceous zinc ore which, on leaching in aqueous sulphuric acid, gives a leach solution containing 6 to 50 grams of dissolved silica per liter, the improvement which comprises treating said ore in a continuous manner and which comprises a first stage and a second stage effected serially in at least two stirred vessels, in the first stage of which the said ore is leached with aqueous sulphuric acid, in a period of between 1 and 6 hours, to an end point pH in the range 1.5 to 2.5 thereby obtaining a pulp containing insoluble solids and dissolved zinc values and 6 to 50 grams of dissolved silica per liter, and in the second stage of which pulp transferred from the first stage and neutralising agent are continuously introduced, in proportions to yield a pH within the range 4.9 to 5.3, into a stirred body of reaction mixture containing precipitated silica particles and providing a total contact time of from 1 to 14 hours for said second stage, thereby substantially preventing precipitation of silica in gelatinous form, wherein each stage of the process is carried out at temperatures ranging from ambient temperatures up to the boiling points of the liquors at atmospheric pressure, whereby a major part of the colloidal silica content of the pulp is converted into a readily filterable form and separating the solid from the liquid phase of the pulp.

2. A process according to claim 1, wherein the siliceous zinc ore contains lead values, said process including a step at the completion of the first stage of the process in which a liquid/solids separation is carried out to provide a lead-rich primary residue.

* * * * *